Dec. 13, 1949  J. J. CUNNINGHAM ET AL  2,491,445
FLOW METER
Filed Feb. 24, 1947
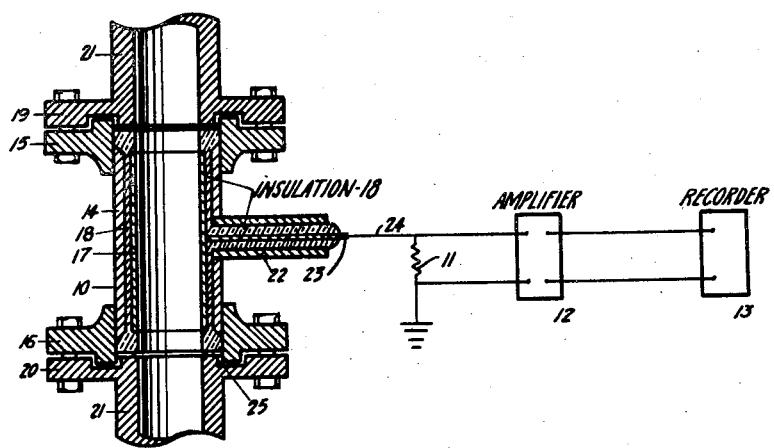
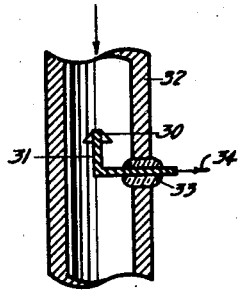
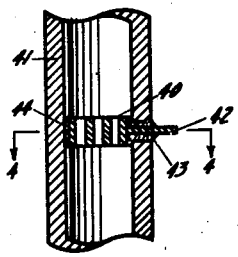
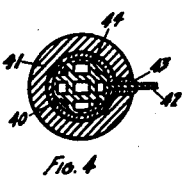
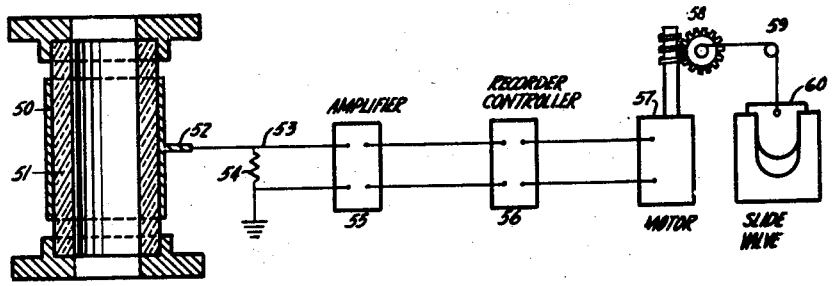
Inventors: James J. Cunningham
Robert W. B. Johnston
Ross E. Phillips
By their Attorney:

Patented Dec. 13, 1949

2,491,445

UNITED STATES PATENT OFFICE 2,491,445

FLOWMETER

James Jay Cunningham and Robert William Beggs Johnston, Houston, and Ross Elton Phillips, Pasadena, Tex., assignors to Shell Development Company, San Francisco, Calif., a corporation of Delaware Application February 24, 1947, Serial No. 730,584

3 Claims. (Cl. 73—194)

The present invention relates to fluid meters and is particularly directed to a system for measuring the flow of fluid containing electrically charged particles, wherein the charges held by the particles entrained in the fluid flow are collected by the apparatus of the present invention and utilized to actuate a device for indicating the rate of particle transfer, said device being calibrated to indicate the rate of fluid flow.

In various industries, certain pulverized or comminuted materials are transported through conduits by means of a suitable fluid pressure such as air, vapors, steam, etc. There are many common applications of this at present, such as the removal of dust from grinding operations, the removal of sawdust from sawing operations, and the like. Besides being used to remove waste and by-products, such methods may be also used to transport raw materials to or from storage. In such operations, the flow rate of material through the conduit is usually of no consideration as it is possible for the transported material to be readily measured at the beginning or end of the operation, if it is so desired.

However, in some operations where large quantities of a finely divided or ground solid material are circulated and re-circulated through a closed system, it is desirable to know the flow rate through said system. An example of such a closed system is a catalytic cracking unit commonly used in the petroleum industry. Measurements of catalyst flow rates in such cracking units are now accomplished by any of several methods: namely, the carbon balance method which is based on the differential of the carbon content between the spent and the regenerated catalyst, the heat balance method in which a heat balance is calculated for the system, and the static head method where the flow rate is based upon measurement of the differential pressure in a vertical section of the spent catalyst return line to the regenerator.

All these methods of determining flow rates of catalysts have been used with varying degrees of success. Due to the number of factors involved and the possibility of numerous errors, known and unkown, in the above methods, it is seldom possible to obtain a flow rate figure by calculation and analysis that is within 10% of the actual figure. Flow rates of fluid catalysts in catalytic cracking units are of considerable importance as it is quite common for such units to recirculate hundreds of tons of catalyst at rates of 2 to 30 tons per minute. It is therefore a primary object of this invention to provide an apparatus adapted to measure the flow rate of a fluid containing particles capable of picking up and/or carrying an electrical charge.

When such a catalyst flows, there is a static charge built up on the surface of the catalyst particles. Such catalysts are used in catalytic cracking units in the oil industry; Filtrol, a treated montmorillonite clay in finely divided form, being an example of a natural catalyst, and Aerocat, a silica-alumina catalyst, being an example of a synthetic catalyst. The rate of flow of the catalyst can be determined by a summation of the magnitudes of the potentials of the charges carried by the number of particles passing any given transverse plane in the conduit. Therefore, it is a further object of this invention to provide an apparatus adapted to collect the charge from a proportional number of the catalyst particles and means for measuring the potential of the charge induced on or imparted to the collecting apparatus. Since it would be impractical and impossible to have every catalyst particle contact a collector apparatus so as to collect the charges from each particle, the collector that is inserted in the catalyst conduit is designed to collect the charges from only a porportional number (e. g. 5%) of the particles flowing through the conduit. The actual flow rate of the catalyst in the conduit is then obtained by calibrating the instrument recording the charge measured, or by the use of calibration charts for each operating condition. Any calibration must necessarily take into consideration such factors as the weight, size and composition of the solid materials being recycled, the temperature and composition of the transporting fluid, the conduit material, the grounding of the conduit, and the presence of any other factors such as contaminating materials (e. g. steam), etc.

Other objects of this invention will be understood from the following description of the present invention taken with reference to the attached drawings, wherein:

Fig. 1 is a diagrammatic view in longitudinal section of one embodiment of a flow meter, according to the present invention having a tubular collector element positioned in an insulated manner within the conduit, said collector being electrically connected to means for measuring a charge.

Fig. 2 is a diagrammatic view in cross section of another embodiment of the present flow meter having a cone-shaped collector element inserted in and insulated from the conduit.

Fig. 3 is a diagrammatic view in cross section of another embodiment of the present flow meter having a grid collector element inserted in and insulated from the conduit.

Fig. 4 is a cross sectional view taken along the line 4—4 in Fig. 3.

Fig. 5 is a diagrammatic view in longitudinal section of one embodiment of a flow meter according to the present invention, having a tubular collector element positioned outside a dielectric conduit, said collector being connected electrically to means for measuring a charge and utilizing it to operate flow controlling means.

Briefly, the flow meter comprises a metal collector designed to be positioned in or around a fluid catalyst conduit and operatively connected to a suitable measuring or recording device, said flow meter being adapted to measure the flow rate of any fluid containing electrically charged particles by measuring the charge imparted on the collector by a proportional number of charged particles of flowing catalyst.

As shown in Fig. 1, the flow meter consists of a collector unit 10 electrically connected to a suitable measuring device comprising a grounded resistor 11 coupled to an amplifier 12 and a measuring or recording instrument 13. One form of the collector unit 10 comprises a special insulated section of pipe inserted in a catalyst conduit 21, said unit having a tubular outer housing or body member 14 with suitable connecting means at each end, such as flanges 15 and 16. The collector zone or element 17 is a metallic tubular section diametrically smaller and, preferably, slightly shorter than the body member 14, said collector element being mounted fixedly within and insulated electrically from said body member 14 by a layer of electrical insulating material 18. As illustrated in Fig. 1, the insulating material 18 extends from the face of flange 15 to flange face 16; also, mica washers 25 as used between the faces of flanges 15 and 16 and the adjacent faces of the connecting flanges 19 and 20 to further insulate the metallic collector element 17 from the conduit 21. The conduit 21 may not necessarily be the main catalyst flow conduit, being more conveniently merely a by-pass conduit of relatively small diameter and rated capacity provided for flow rate measurement purposes.

Since the bore of the tubular collector element 17 is equal in diameter to the bore of the main catalyst conduit 21, the tubular body member 14 is fabricated from a section of pipe of larger inner diameter in order to accommodate the collector element 17 and its insulating sheath 18. A short section of pipe 22 is mounted in any suitable manner, as for example by welding, to the outside wall of the body member 14, the bore of said pipe being in communication with the bore and, preferably substantially perpendicular to the axis, of said body member 14. A small rod 23 passing through the bore of said pipe section 22 has one end electrically connected to the collector element 17 while the free end of said rod 23 extends slightly beyond the pipe end and serves as a terminal for the lead 24 to the resistor 11, amplifier 12 and recorder 13. The annular space between the rod 23 and its surrounding pipe or casing 22 is filled with electrical insulation material 18.

It is known that solid particles, entrained in fluid catalyst flow, become electrically charged during their passage through a conduit or pipe. In the operation of the flow meter of the present invention, the charged particles of the flowing fluid catalyst strike the collector element 17 so that a charge is transmitted thereto and accumulated thereon causing a current to flow through the resistor 11 which in turn results in measurable potential drop. The voltage drop across the resistor 11 is measured by means of measuring devices such for example as an electrometer type amplifier 12, which would draw very little or no current from the primary measuring or collector element 17. The amplifier 12 in turn supplies electrical energy to actuate any suitable indicating or recording instrument 13, such as, a voltmeter, milliameter or galvanometer, preferably one of the recording type. The recording instrument selected can be calibrated to various operating conditions and thus indicate or record the flow rate of the catalyst in pounds per hour, tons per minute, or any unit desired. Any commercially avilable resistor of suitable resistance may be used.

In many operations the catalyst transfer lines are not necessarily filled with catalyst at all times with the result that the flowing stream through a vertical section of the conduit often shifts from one part or side of the conduit to another, i. e. exhibits a wandering tendency. Thus a collector element 17 of the type shown in Fig. 1 is generally used in order to surround the catalyst stream entirely and correct for any possible error that might be introduced by the wandering tendency of the individual charged particles since the stream can contact this tubular type collector element at any point on the circumference of the transfer line. However, any other type of a metal collector element may be inserted in the catalyst conduit if insulated therefrom in a suitable manner. Two alternate types are shown in Figs. 2, 3 and 4. In Fig. 2 the collector element 30 comprises a cone-shaped shield attached to a rod 31 extending through an insulating plug 33 in the wall of a conduit 32, the end of said rod serving as a terminal for the lead 34 to a suitable electrical measuring device. The rod 31 is bent at right angles within the pipe 32 so that the end to which the cone-shaped shield is attached is positioned at the longitudinal axis of said pipe. In Figs. 3 and 4, the collector element comprises a metal grid plate 40 positioned in a conduit 41 in a position substantially perpendicular to the fluid stream. A rod 42 is attached to the grid 40 and extends outside the conduit 41 through a plug of insulation material 43, the end of said rod serving as a terminal for a lead in a similar manner as in the abovementioned embodiments. The metal grid plate 40 is separated from the conduit by electrical insulation 44.

The operating conditions in some systems involving fluid catalyst transfer have been such that it was found undesirable to insert a metal collector element into the catalyst stream itself. In such cases a flow meter of the type shown in Fig. 5 is used in which the collector element 50 is a metallic shield which closely surrounds a conduit 51 of glass or any dielectric material which is suitable to such operating conditions as heat, abrasion, chemical action, etc., that are peculiar to the process involved. It is understood that the dielectric conduit 51 may consist of a relatively short tubular section made of dielectric material and connected into a conduit made of any other desirable type of material. A rod 52 attached to the collector element 50 serves as a terminal for lead 53. Charged particles of a fluid catalyst flowing through a section of glass conduit 51 and striking said conduit induce a charge on the collector element 50 through the glass dielectric as in a condenser. The accumulated charge on the collector 50 causes a current to flow through the resistor 54 which in turn results in a measurable potential drop. The voltage drop across said resistor 54 is measured by means of a direct current amplifier 55 which in turns supplies electrical energy to actuate any automatic means for controlling electrically or mechanically the flow rate of a fluid such, for example, as a recorder-controller 56 that is adapted to start a motor 57 in one direction or the other. The motor 57 through any suitable gear 58 and/or pulley 59 arrangement can automatically adjust a modulating slide valve 60 in the catalyst transfer line to maintain the flow of catalyst therethrough at any desired rate. Although the use of a controller has been shown by way of illustration in application to the system of Fig. 1, it is obvious that such controller can equally well be used with any of the systems or embodiments shown in Figs. 1 and 3.

The collector element 50 in Fig. 5 may be of various forms such as, for example, metal foil wrapped around a glass conduit and cemented or soldered if necessary to hold it in place. Other examples are: a close fitting tube of any conducting material such as copper, silver, etc., a coil of wire wound on the glass conduit, a sheath of copper braiding on such conduit or a coating of silver on the outside of the glass. A lead 52 may be suitably connected to any of these embodiments of the collector element 50. If the metal collector element (17, 30 or 40) is in direct contact with the flowing catalyst, it is desirable that the collector element be constructed of a material having a high resistance to the abrasive action of the particles of catalyst. Especially suitable for this invention are such materials as tungsten carbide, high carbon steels, etc.

We claim as our invention:

1. A system for measuring the rate of flow through a conduit of a fluid having entrained therein finely comminuted solid particles each carrying an electrical charge, comprising a tubular section made of dielectric material mounted in co-axial register with said conduit, a metallic sleeve element mounted co-axially with said tubular section in contact with the inner walls thereof, said element being insulated from said conduit by said dielectric tubular section, means comprising an electrical conductor connected to said element for drawing from said element a current proportional to the electric charge accumulating in said element due to the effect of the charged particles flowing in said conduit, and indicating means connected to said conductor for measuring said current.

2. A system for measuring the rate of flow through a conduit of a fluid having entrained therein finely comminuted solid particles each carrying an electrical charge, comprising a tubular section made of dielectric material mounted in co-axial register with said conduit, a metallic sleeve element mounted co-axially with said tubular section in contact with the outer walls thereof, means comprising an electrical conductor connected to said element for drawing from said element a current proportional to the electric charge accumulating in said element due to the effect of the charged particles flowing in said conduit, and indicating means connected to said conductor for measuring said current.

3. A system for measuring the rate of flow through a conduit of a fluid having entrained therein finely comminuted solid particles each carrying an electrical charge, comprising a tubular section made of dielectric material mounted in co-axial register with said conduit, a metallic sleeve element mounted co-axially with said tubular section in contact therewith, said metallic sleeve element being insulated from said conduit by said dielectric tubular section, means comprising an electrical conductor connected to said element for drawing from said element a current proportional to the electric charge accumulating in said element due to the effect of the charged particles flowing in said conduit, and indicating means connected to said conductor for measuring said current.

JAMES JAY CUNNINGHAM.
ROBERT WILLIAM BEGGS JOHNSTON.
ROSS ELTON PHILLIPS.

REFERENCES CITED

The following references are of record in the file of this patent:

UNITED STATES PATENTS

| Number | Name | Date |
|---|---|---|
| 1,855,205 | Schur | Apr. 26, 1932 |
| 2,315,805 | Mayo et al. | Apr. 6, 1943 |

FOREIGN PATENTS

| Number | Country | Date |
|---|---|---|
| 487,354 | Germany | Dec. 5, 1929 |